US012789790B2

(12) United States Patent
Yoda et al.

(10) Patent No.: US 12,789,790 B2
(45) Date of Patent: Nov. 10, 2026

(54) VEHICLE CONTROL DEVICE METHOD, AND STORAGE MEDIUM FOR PERFORMING VEHICLE SITUATIONAL CONTROL

(71) Applicant: HONDA MOTOR CO., LTD., Tokyo (JP)

(72) Inventors: Junya Yoda, Wako (JP); Katsuya Yashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 217 days.

(21) Appl. No.: 18/268,618

(22) PCT Filed: Dec. 28, 2020

(86) PCT No.: PCT/JP2020/049092
§ 371 (c)(1),
(2) Date: Jun. 21, 2023

(87) PCT Pub. No.: WO2022/144954
PCT Pub. Date: Jul. 7, 2022

(65) Prior Publication Data

US 2024/0270237 A1 Aug. 15, 2024

(51) Int. Cl.
*B60W 30/08* (2012.01)
*B60W 10/20* (2006.01)
*B60W 60/00* (2020.01)

(52) U.S. Cl.
CPC ............ *B60W 30/08* (2013.01); *B60W 10/20* (2013.01); *B60W 60/005* (2020.02);
(Continued)

(58) Field of Classification Search
CPC ...... B60W 30/00; B60W 10/00; B60W 60/00; B60W 2554/00; B60W 2710/00; B60W 2720/00; B60W 2540/00
See application file for complete search history.

(56) References Cited

U.S. PATENT DOCUMENTS 12,097,884 B2 * 9/2024 Li ..................... B60W 60/0017
12,522,239 B2 * 1/2026 Terazawa ............ B60W 60/001
(Continued)

FOREIGN PATENT DOCUMENTS

JP 2019-119310 7/2019
JP 2020-128165 8/2020
(Continued)

OTHER PUBLICATIONS

International Search Report and Written Opinion for International Application No. PCT/JP2020/049092 mailed on Mar. 16, 2021, 11 pages.

*Primary Examiner* — Aniss Chad
*Assistant Examiner* — Elizabeth J Slowik
(74) *Attorney, Agent, or Firm* — Amin, Turocy & Watson, LLP

(57) ABSTRACT

A vehicle control device includes a recognizer configured to recognize a surrounding situation of a vehicle, a driving controller configured to control steering, acceleration, and deceleration of the vehicle independently of an operation of a driver of the vehicle, and a mode decider configured to decide on a driving mode of the vehicle as one of a plurality of driving modes including a first driving mode and a second driving mode. Implementation of the second driving mode is restricted when the interrupting vehicle is recognized and a prescribed condition is satisfied.

9 Claims, 9 Drawing Sheets

(52) U.S. Cl.
CPC ............... *B60W 2554/4041* (2020.02); *B60W 2554/4045* (2020.02); *B60W 2554/802* (2020.02); *B60W 2710/20* (2013.01); *B60W 2720/106* (2013.01)

(56) References Cited

U.S. PATENT DOCUMENTS

| | | | | |
|---|---|---|---|---|
| 2019/0351906 | A1* | 11/2019 | Oh | B60W 30/0956 |
| 2020/0255012 | A1 | 8/2020 | Sato | |
| 2020/0283027 | A1* | 9/2020 | Okuyama | B60W 50/082 |
| 2020/0307582 | A1 | 10/2020 | Sato | |
| 2020/0307594 | A1 | 10/2020 | Kato et al. | |
| 2021/0316733 | A1* | 10/2021 | Mizoguchi | B60W 30/146 |
| 2021/0339773 | A1* | 11/2021 | Lee | B60W 60/0059 |
| 2021/0380136 | A1* | 12/2021 | Choi | B60W 60/0016 |
| 2022/0089164 | A1* | 3/2022 | Wang | B60W 30/18163 |
| 2022/0194372 | A1* | 6/2022 | Kitajima | B60W 30/143 |
| 2022/0340166 | A1* | 10/2022 | Kume | G08G 1/0133 |
| 2023/0018303 | A1* | 1/2023 | Itou | B60W 60/00 |
| 2023/0256992 | A1* | 8/2023 | Terazawa | G16Y 40/20 701/23 |
| 2023/0271613 | A1* | 8/2023 | Dülgar | G08G 1/164 701/25 |
| 2023/0286509 | A1* | 9/2023 | Kume | B60W 60/0051 |

FOREIGN PATENT DOCUMENTS

| | | |
|---|---|---|
| JP | 2020-157985 | 10/2020 |
| JP | 2020-163908 | 10/2020 |

* cited by examiner

FIG. 3

| DRIVING MODE | CONTROL STATE | TASK |
|---|---|---|
| MODE A | AUTOMATED DRIVING | FORWARD MONITORING: UNNECESSARY STEERING GRIP: UNNECESSARY |
| MODE B | DRIVING ASSISTANCE | FORWARD MONITORING: NECESSARY STEERING GRIP: UNNECESSARY |
| MODE C | DRIVING ASSISTANCE | FORWARD MONITORING: NECESSARY STEERING GRIP: NECESSARY |
| MODE D | DRIVING ASSISTANCE | FORWARD MONITORING: UNNECESSARY AT LEAST CERTAIN DEGREE OF DRIVING OPERATION IS NECESSARY |
| MODE E | MANUAL DRIVING | FORWARD MONITORING: NECESSARY DRIVING OPERATION IS NECESSARY TOGETHER WITHSTEERING AND ACCELERATION/DECELERATION |

TASK:LIGHT

TASK:HEAVY

VEHICLE CONTROL DEVICE METHOD, AND STORAGE MEDIUM FOR PERFORMING VEHICLE SITUATIONAL CONTROL

TECHNICAL FIELD

The present invention relates to a vehicle control device, a vehicle control method, and a storage medium.

BACKGROUND ART

In the related art, an invention of a travel control device, which acquires an automated driving state of a vehicle to be verified within a prescribed range around a host vehicle, changes an inter-vehicle distance from another vehicle based on the automated driving state, and changes the inter-vehicle distance depending on whether the automated driving state is an unverified state in which the vehicle to be verified is an automated driving vehicle and cannot be verified to be in a correct automated driving state or a verified state in which the correct automated driving state can be verified, has been disclosed (Patent Document 1).

CITATION LIST

Patent Document

[Patent Document 1]
Japanese Unexamined Patent Application, First Publication No. 2019-119310

SUMMARY OF INVENTION

Technical Problem

However, other vehicles in the vicinity of the vehicle are not necessarily automated driving vehicles, such that various situations may occur. Accordingly, in the related art, it may not be possible to perform appropriate control according to a situation at the time of interruption.

The present invention has been made in consideration of such circumstances and an objective of the present invention is to provide a vehicle control device, a vehicle control method, and a program capable of performing appropriate control according to a situation at the time of interruption.

Solution to Problem

A vehicle control device according to the present invention adopt the following configurations.

(1): According to an embodiment of the present invention, there is provided a vehicle control device including: a recognizer configured to recognize a surrounding situation of a vehicle: a driving controller configured to control steering, acceleration, and deceleration of the vehicle independently of an operation of a driver of the vehicle; and a mode decider configured to decide on a driving mode of the vehicle as one of a plurality of driving modes including a first driving mode and a second driving mode and change the driving mode of the vehicle to a driving mode having a heavier task when a task related to the decided driving mode is not executed by the driver, wherein the second driving mode is a driving mode having a lighter task imposed on the driver than the first driving mode and some of the plurality of driving modes including at least the second driving mode are controlled by the driving controller, wherein the recognizer recognizes an interrupting vehicle that is a vehicle cutting into a travel path along which the vehicle is traveling, and wherein the mode decider restricts implementation of the second driving mode when the interrupting vehicle is recognized by the recognizer and a prescribed condition is satisfied.

(2): In the above-described aspect (1), the second driving mode is a driving mode in which a task of gripping an operator for receiving a steering operation is not imposed on the driver, and the first driving mode is a driving mode in which a driving operation of the driver is necessary in relation to at least one of the steering of the vehicle and the acceleration and deceleration of the vehicle.

(3): In the above-described aspect (1), the second driving mode is a driving mode in which a task of gripping an operator for receiving a steering operation is not imposed on the driver, and the first driving mode is a driving mode in which at least the task of gripping the operator for receiving the steering operation of the driver is imposed on the driver.

(4): In the above-described aspect (1), the prescribed condition is that a magnitude of deceleration based on the deceleration control is greater than or equal to reference deceleration.

(5): In the above-described aspect (1), the prescribed condition is that a degree of proximity between the vehicle and the interrupt vehicle is higher than a first reference degree at an end point of a section where the interrupting vehicle can cut into the travel path along which the vehicle is traveling.

(6): In the above-described aspect (1), the prescribed condition is that an elapsed period of time after a start of the deceleration control is greater than or equal to a first reference period of time.

(7): In the above-described aspect (1), the prescribed condition is that speeds of the vehicle and the interrupting vehicle are less than or equal to a first reference speed and a state in which an inter-vehicle distance between the vehicle and a preceding vehicle located in front of the vehicle on the travel path is greater than or equal to a first inter-vehicle distance has continued for a second reference period of time or longer.

(8): In the above-described aspect (1), the prescribed condition is that the speed of the vehicle is decreased to a second reference speed or higher after a start of the deceleration control.

(9): In the above-described aspect (1), the prescribed condition is that there is another vehicle which is behind the interrupting vehicle and whose inter-vehicle distance from the interrupting vehicle is less than a second reference inter-vehicle distance.

(10): According to another embodiment of the present invention, there is provided a vehicle control method including: recognizing, by a computer mounted in a vehicle, a surrounding situation of the vehicle: controlling, by the computer, steering, acceleration, and deceleration of the vehicle independently of an operation of a driver of the vehicle; deciding, by the computer, on a driving mode of the vehicle as one of a plurality of driving modes including a first driving mode and a second driving mode and changing the driving mode of the vehicle to a driving mode having a heavier task when a task related to the decided driving mode is not executed by the driver, wherein the second driving mode is a driving mode having a lighter task imposed on the driver than the first driving mode and some of the plurality of driving modes including at least the second driving mode are performed by controlling the steering, the acceleration, and the deceleration of the vehicle independently of the operation of the driver of the vehicle: recognizing, by the computer, an interrupting vehicle that is a vehicle cutting into a travel path along which the vehicle is traveling during the recognition; and restricting, by the computer, implementation of the second driving mode when the interrupting vehicle is recognized and a prescribed condition is satisfied.

(11): According to yet another embodiment of the present invention, there is provided a computer-readable non-transitory storage medium storing a program for causing a computer mounted in a vehicle to: recognize a surrounding situation of the vehicle; control steering, acceleration, and deceleration of the vehicle independently of an operation of a driver of the vehicle; decide on a driving mode of the vehicle as one of a plurality of driving modes including a first driving mode and a second driving mode and change the driving mode of the vehicle to a driving mode having a heavier task when a task related to the decided driving mode is not executed by the driver, wherein the second driving mode is a driving mode having a lighter task imposed on the driver than the first driving mode and some of the plurality of driving modes including at least the second driving mode are performed by controlling the steering, the acceleration, and the deceleration of the vehicle independently of the operation of the driver of the vehicle; recognize an interrupting vehicle that is a vehicle cutting into a travel path along which the vehicle is traveling during the recognition; and restrict implementation of the second driving mode when the interrupting vehicle is recognized and a prescribed condition is satisfied.

Advantageous Effects of Invention

According to the above-described aspects (1) to (11), appropriate control can be performed according to a situation at the time of interruption.

BRIEF DESCRIPTION OF DRAWINGS

FIG. 3 is a diagram showing an example of corresponding relationships between driving modes, control states of a host vehicle, and tasks.

DESCRIPTION OF EMBODIMENTS

Embodiments of a vehicle control device, a vehicle control method, and a storage medium of the present invention will be described below with reference to the drawings.

[Overall Configuration]

Figure 1:
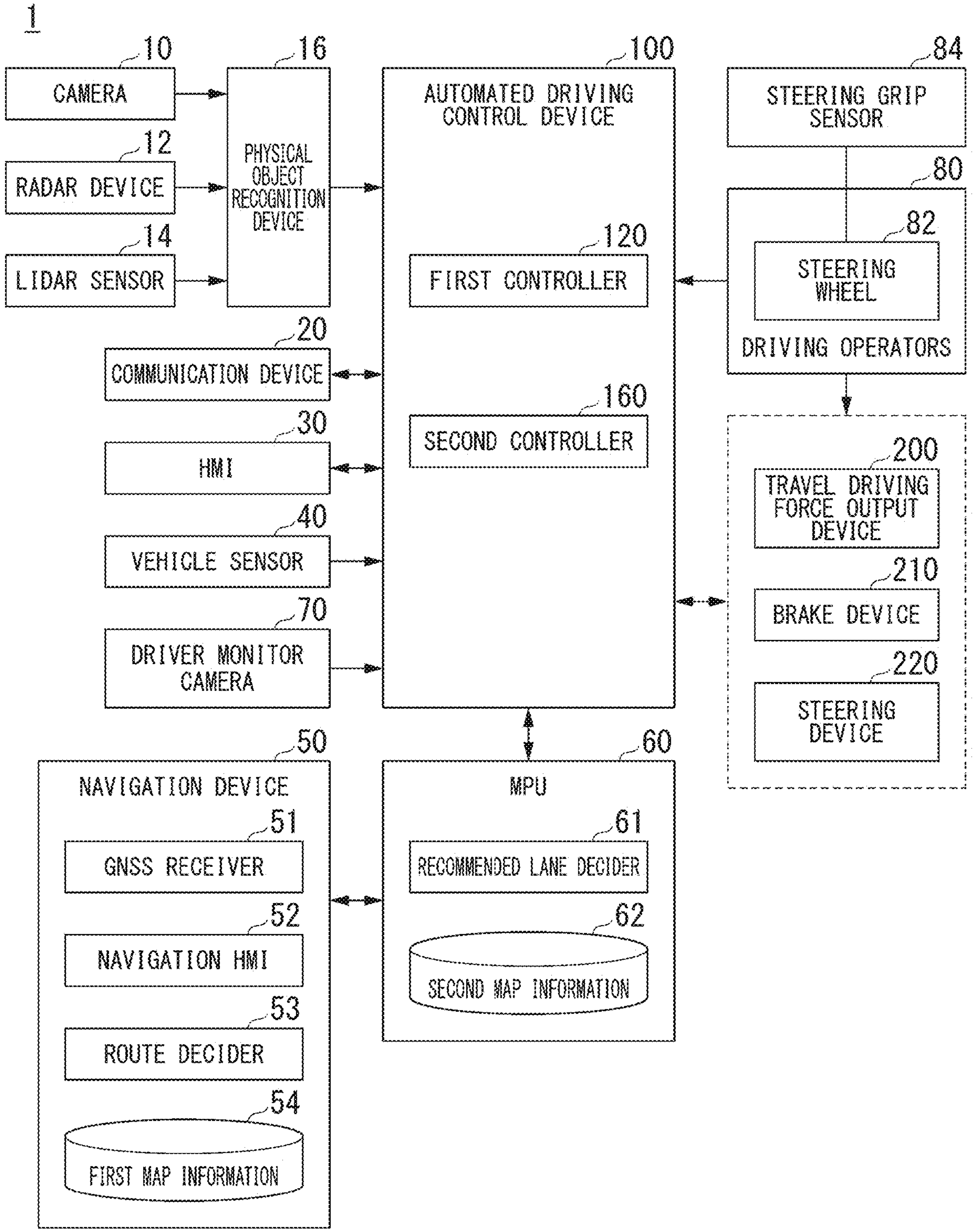
FIG. 1 is a configuration diagram of a vehicle system using a vehicle control device according to an embodiment.

FIG. 1 is a configuration diagram of a vehicle system 1 using the vehicle control device according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power that is supplied when a secondary battery or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, a driver monitor camera 70, driving operators 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. Also, the configuration shown in FIG. 1 is merely an example and some of the components may be omitted or other components may be further added.

For example, the camera 10 is a digital camera using a solid-state imaging element such as a charge-coupled device (CCD) or a complementary metal-oxide semiconductor (CMOS). The camera 10 is attached to any location on the vehicle (hereinafter referred to as a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any location on the host vehicle M. The radar device 12 may detect a position and a speed of the physical object in a frequency modulated continuous wave (FM-CW) scheme.

The LIDAR sensor 14 radiates light (or electromagnetic waves having a wavelength close to light) to the vicinity of the host vehicle M and measures scattered light. The LIDAR sensor 14 detects a distance to an object based on time from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. The physical object recognition device 16 may be omitted from the vehicle system 1.

The communication device 20 communicates with another vehicle located in the vicinity of the host vehicle M using, for example, a cellular network or a Wi-Fi network, Bluetooth (registered trademark), dedicated short range communication (DSRC), or the like, or communicates with various types of server devices via a radio base station.

The HMI 30 presents various types of information to an occupant of the host vehicle M and receives an input operation from the occupant. The HMI 30 includes various types of display devices, a speaker, a buzzer, a touch panel, a switch, keys, and the like.

The vehicle sensor 40 includes a vehicle speed sensor configured to detect the speed of the host vehicle M, an acceleration sensor configured to detect acceleration, a yaw rate sensor configured to detect angular velocity around a vertical axis, a direction sensor configured to detect a direction of the host vehicle M, and the like.

For example, the navigation device 50 includes a global navigation satellite system (GNSS) receiver 51, a navigation HMI 52, and a route decider 53. The navigation device 50 stores first map information 54 in a storage device such as a hard disk drive (HDD) or a flash memory. The GNSS receiver 51 identifies a position of the host vehicle M based on a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decider 53 decides on a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include the curvature of a road, point of interest (POI) information, and the like. The route on the map is output to the MPU 60. The navigation device 50 may perform route guidance using the navigation HMI 52 based on the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane decider 61 and stores second map information 62 in a storage device such as an HDD or a flash memory. The recommended lane decider 61 divides the route on the map provided from the navigation device 50 into a plurality of blocks (for example, divides the route every 100 [m] in a traveling direction of the vehicle), and decides on a recommended lane for each block with reference to the second map information 62. The recommended lane decider 61 decides in what lane numbered from the left the vehicle will travel. The recommended lane decider 61 decides on the recommended lane so that the host vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. Also, the second map information 62 may include road information, traffic regulations information, address information (an address/postal code), facility information, telephone number information, information of a prohibition section in which mode A or B to be described below is prohibited, and the like. The second map information 62 may be updated at any time when the communication device 20 communicates with another device.

The driver monitor camera 70 is, for example, a digital camera that uses a solid-state image sensor such as a CCD or a CMOS. The driver monitor camera 70 is attached to any location on the host vehicle M with respect to a position and a direction where the head of the occupant (hereinafter, the driver) sitting in the driver's seat of the host vehicle M can be imaged from the front (in a direction in which his/her face is imaged). For example, the driver monitor camera 70 is attached to an upper part of a display device provided on the central portion of the instrument panel of the host vehicle M.

For example, the driving operators 80 include an accelerator pedal, a brake pedal, a shift lever, and other operators in addition to a steering wheel 82. A sensor configured to detect an amount of operation or the presence or absence of an operation is attached to the driving operator 80 and a detection result of the sensor is output to the automated driving control device 100 or some or all of the travel driving force output device 200, the brake device 210, and the steering device 220. The steering wheel 82 is an example of an "operator that receives a steering operation by the driver." The operator does not necessarily have to be annular and may be in the form of a variant steer, a joystick, a button, or the like. A steering grip sensor 84 is attached to the steering wheel 82. The steering grip sensor 84 is implemented by a capacitance sensor or the like and outputs a signal for detecting whether or not the driver is gripping the steering wheel 82 (indicating that the driver is in contact with the steering wheel 82 in a state in which a force is applied) to the automated driving control device 100.

The automated driving control device 100 includes, for example, a first controller 120 and a second controller 160. Each of the first controller 120 and the second controller 160 is implemented, for example, by a hardware processor such as a CPU executing a program (software). Also, some or all of these components may be implemented by hardware (including a circuit: circuitry) such as a large scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device. The automated driving control device 100 is an example of a "vehicle control device" and a combination of the action plan generator 140 and the second controller 160 is an example of a "driving controller."

Figure 2:
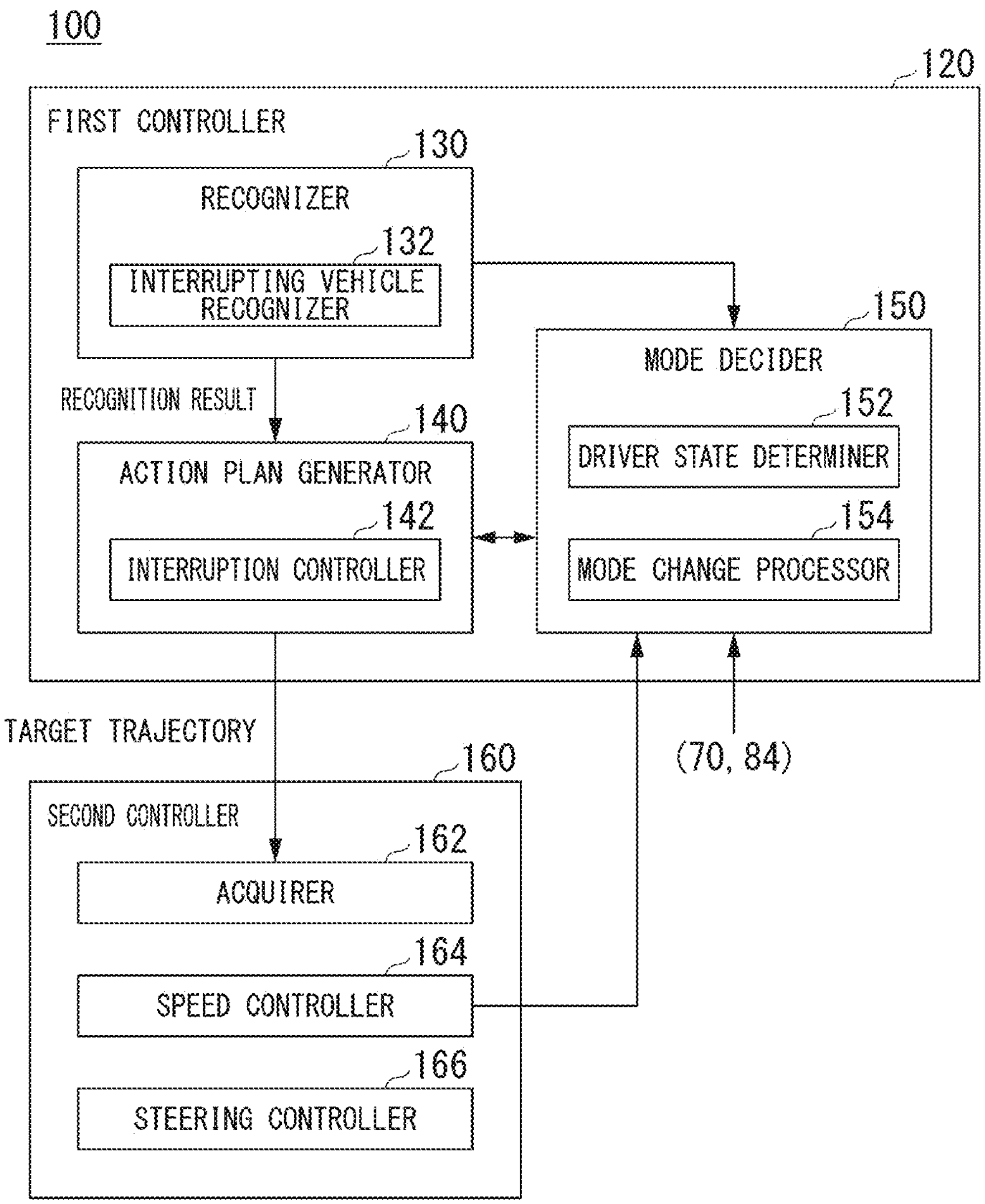
FIG. 2 is a functional configuration diagram of a first controller and a second controller.

FIG. 2 is a functional configuration diagram of the first controller 120 and the second controller 160. The first controller 120 includes, for example, a recognizer 130, an action plan generator 140, and a mode decider 150. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road signs, or the like with which pattern matching is possible) in parallel and performing comprehensive evaluation by assigning scores to both recognition processes. Thereby, the reliability of the automated driving is ensured.

The recognizer 130 recognizes states of positions, speeds, acceleration, and the like of physical objects near the host vehicle M based on information input from the camera 10, the radar device 12, and the LIDAR sensor 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by an area. The "state" of a physical object may include acceleration or jerk of the physical object or an "action state" (for example, whether or not a lane change is being made or intended).

Also, the recognizer 130 recognizes, for example, a lane in which the host vehicle M is traveling (a travel lane). For example, the recognizer 130 recognizes the travel lane by comparing a pattern of road markings (for example, an arrangement of solid lines and dashed lines) obtained from the second map information 62 with a pattern of road markings near the host vehicle M recognized from an image captured by the camera 10. The recognizer 130 may recognize the travel lane by recognizing a travel path boundary (a road boundary) including a road marking, a road shoulder, a curb, a median strip, a guardrail, or the like as well as a road marking. In this recognition, a position of the host vehicle M acquired from the navigation device 50 or a processing result of the INS may be taken into account. Also, the recognizer 130 may recognize a temporary stop line, an obstacle, a red traffic light, a toll gate, and other road events.

When the travel lane is recognized, the recognizer 130 recognizes a position or an orientation of the host vehicle M with respect to the travel lane. For example, the recognizer 130 may recognize the deviation of a reference point of the host vehicle M from the center of the lane and an angle formed between the traveling direction of the host vehicle M and a line connected to the center of the lane as a relative position and orientation of the host vehicle M related to the travel lane. Alternatively, the recognizer 130 may recognize a position of the reference point of the host vehicle M related to one side end portion (a road marking or a road boundary) of the travel lane or the like as a relative position of the host vehicle M related to the travel lane.

The recognizer 130 includes an interrupting vehicle recognizer 132. A function of the interrupting vehicle recognizer 132 will be described below.

In principle, the action plan generator 140 travels in the recommended lane determined by the recommended lane decider 61. Furthermore, the action plan generator 140 generates a target trajectory along which the host vehicle M will travel in the future automatically (independently of the driver's operation) so that it is possible to cope with the surrounding situation of the host vehicle M. For example, the target trajectory includes a speed element. For example, the target trajectory is represented by sequentially arranging points (trajectory points) at which the host vehicle M is required to arrive. The trajectory points are points at which the host vehicle M is required to arrive for each prescribed traveling distance (for example, about several meters [m]) along a road. In addition, a target speed and target acceleration for each prescribed sampling time (for example, about 0.x [see] where x is a decimal number) are generated as parts of the target trajectory. The trajectory point may be a position at which the host vehicle M is required to arrive at the sampling time for each prescribed sampling time. In this case, information of the target speed or the target acceleration is represented by an interval between the trajectory points.

The action plan generator 140 may set an automated driving event when a target trajectory is generated. Automated driving events include a constant-speed traveling event, a low-speed tracking traveling event, a lane change event, a branch-point-related movement event, a merging-point-related movement event, a takeover event, and the like. The action plan generator 140 generates a target trajectory according to an activated event.

The action plan generator 140 includes an interruption controller 142. A function of the interruption controller 142 will be described below.

The mode decider 150 decides on a driving mode of the host vehicle M as one of a plurality of driving modes. The plurality of driving modes have different tasks imposed on the driver. The mode decider 150 includes, for example, a driver state determiner 152 and a mode change processor 154. These individual functions will be described below.

FIG. 3 is a diagram showing an example of corresponding relationships between the driving modes, the control states of the host vehicle M, and the tasks. For example, there are five modes from mode A to mode E as the driving modes of the host vehicle M. A control state, i.e., a degree of automation of the driving control of the host vehicle M, is highest in mode A, lower in the order of mode B, mode C, and mode D, and lowest in mode E. In contrast, a task imposed on the driver is lightest in mode A, heavier in the order of mode B, mode C, and mode D, and heaviest in mode E. Because of a control state that is not automated driving in modes D and E, the automated driving control device 100 is responsible for ending control related to automated driving and shifting the driving mode to driving assistance or manual driving. The content of the driving modes will be exemplified below. Also, mode A and/or mode B are examples of a "second driving mode" and some or all of modes C, D, and E are an example of a "first driving mode".

In mode A, in an automated driving state, neither forward monitoring nor gripping of the steering wheel 82 (a steering grip in FIG. 3) is imposed on the driver. However, even in mode A, the driver is required to be in a posture where the fast shift to manual driving is enabled in response to a request from the system centered on the automated driving control device 100. Also, the term "automated driving" as used herein indicates that both steering and acceleration/deceleration are controlled independently of the operation of the driver. The term "forward region or direction" indicates a space in a traveling direction of the host vehicle M that is visually recognized via the front windshield. Mode A is a driving mode in which the host vehicle M travels at a prescribed speed (for example, about 50 [km/h]) or less on a motorway such as an expressway and which can be executed when a condition in which there is a tracking target preceding vehicle or the like is satisfied. Mode A may be referred to as a traffic jam pilot (TJP). When this condition is no longer satisfied, the mode decider 150 changes the driving mode of the host vehicle M to mode B.

In mode B, in a driving assistance state, a task of monitoring a forward direction of the host vehicle M (hereinafter referred to as forward monitoring) is imposed on the driver, but a task of gripping the steering wheel 82 is not imposed on the driver. In mode C, in a driving assistance state, a forward monitoring task and a task of gripping the steering wheel 82 are imposed on the driver. Mode D is a driving mode in which a certain degree of driving operation of the driver is required for at least one of steering and acceleration/deceleration of the host vehicle M. For example, in mode D, driving assistance such as adaptive cruise control (ACC) or a lane keeping assist system (LKAS) is performed. In mode E, manual driving in which a task requiring a driving operation for both steering and acceleration/deceleration is imposed on the driver is performed. In both modes D and E, a task of monitoring a forward direction of the host vehicle M is naturally imposed on the driver.

The automated driving control device 100 (and the driving assistance device (not shown)) makes an automated lane change corresponding to the driving mode. Automated lane changes include an automated lane change (1) due to a system request and an automated lane change (2) due to a driver request. Examples of the automated lane change (1) include an automated lane change for passing and an automated lane change for traveling toward a destination (an automated lane change based on a change in a recommended lane) performed when the speed of the preceding vehicle is less than the speed of the host vehicle by a reference level or higher. In the automated lane change (2), if a condition related to a speed, a positional relationship associated with a nearby vehicle, or the like is satisfied, the host vehicle M is allowed to change the lane in an operation direction when a direction indicator has been operated by the driver.

The automated driving control device 100 does not execute either of the automated lane changes (1) and (2) in mode A. The automated driving control device 100 executes both automated lane changes (1) and (2) in modes B and C. The driving assistance device (not shown) does not execute the automated lane change (1) but executes the automated lane change (2) in mode D. In mode E, neither of the automated lane changes (1) and (2) is executed.

The mode decider 150 changes the driving mode of the host vehicle M to a driving mode in which a task is heavier when the task associated with the decided driving mode (hereinafter referred to as a current driving mode) is not executed by the driver.

For example, in mode A, when the driver is in a posture where he/she cannot shift the driving to manual driving in response to a request from the system (for example, when he/she continues to look outside an allowable area or when a sign that driving is difficult is detected), the mode decider 150 performs a control process of prompting the driver to shift the driving to manual driving using the HMI 30, causing the host vehicle M to gradually stop close to the road shoulder when the driver does not respond, and stopping the automated driving. After the automated driving is stopped, the host vehicle is in a state of mode D or E. Thereby, the host vehicle M can be started according to the manual driving of the driver. Hereinafter, the same is true for “stopping of automated driving.” When the driver is not performing forward monitoring in mode B, the mode decider 150 performs a control process of prompting the driver to perform the forward monitoring using the HMI 30, causing the host vehicle M to gradually stop close to the road shoulder when the driver does not respond, and stopping the automated driving. When the driver is not performing forward monitoring or is not gripping the steering wheel 82 in mode C, the mode decider 150 performs a control process of prompting the driver to perform the forward monitoring and/or grip the steering wheel 82 using the HMI 30, causing the host vehicle M to gradually stop close to the road shoulder when the driver does not respond, and stopping the automated driving.

The driver state determiner 152 monitors the driver’s state for the above-described mode change and determines whether or not the driver’s state is appropriate for the task. For example, the driver state determiner 152 performs a posture estimation process by analyzing the image captured by the driver monitor camera 70 and determines whether or not the driver is in a posture in which it is difficult to shift the driving to manual driving in response to a request from the system. Also, the driver state determiner 152 performs a visual line estimation process by analyzing the image captured by the driver monitor camera 70 and determines whether or not the driver is performing forward monitoring.

The mode change processor 154 performs various types of processes for the mode change. For example, the mode change processor 154 instructs the action plan generator 140 to generate a target trajectory for stopping on the road shoulder, instructs a driving assistance device (not shown) to operate, or controls the HMI 30 for prompting the driver to take an action.

The second controller 160 controls the travel driving force output device 200, the brake device 210, and the steering device 220 so that the host vehicle M passes along the target trajectory generated by the action plan generator 140 at the scheduled times.

Returning to FIG. 2. the second controller 160 includes, for example, an acquirer 162, a speed controller 164, and a steering controller 166. The acquirer 162 acquires information of a target trajectory (trajectory points) generated by the action plan generator 140 and causes a memory (not shown) to store the information. The speed controller 164 controls the travel driving force output device 200 or the brake device 210 based on a speed element associated with the target trajectory stored in the memory. The steering controller 166 controls the steering device 220 in accordance with a degree of curvature of the target trajectory stored in the memory. The processes of the speed controller 164 and the steering controller 166 are implemented by, for example, a combination of feedforward control and feedback control. As an example, the steering controller 166 executes feedforward control according to the curvature of the road in front of the host vehicle M and feedback control based on deviation from the target trajectory in combination.

The travel driving force output device 200 outputs a travel driving force (torque) for enabling the vehicle to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the driving operator 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operator 80 so that brake torque according to a braking operation is output to each wheel. The brake device 210 may include a mechanism configured to transfer the hydraulic pressure generated according to an operation on the brake pedal included in the driving operators 80 to the cylinder via a master cylinder as a backup. Also, the brake device 210 is not limited to the above-described configuration and may be an electronically controlled hydraulic brake device configured to control an actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the driving operator 80 to change the direction of the steerable wheels.

[Control During Interruption]

Hereinafter, control during interruption executed by the vehicle recognizer 132, the interruption controller 142, and the mode change processor 154 in cooperation will be described.

The interrupting vehicle recognizer 132 recognizes an interrupting vehicle that is a vehicle cutting into a travel path along which the host vehicle M is traveling. The travel path is, for example, a lane, but may be a travel path determined from the presence of a road shoulder or the like on a road without a road marking or a travel path assumed to be virtual in a section in front of a toll gate or the like. In the following description, the travel path is assumed to be a lane and the lane in which the host vehicle M is traveling is referred to as a host vehicle lane. As a situation where the interrupting vehicle cuts into the host vehicle lane, there are a situation where the host vehicle M is traveling in a main lane and the interrupting vehicle is traveling in a merging lane that merges into the main lane (a merging situation) and a situation where the host vehicle M is traveling on a road with a plurality of one-way lanes and the interrupting vehicle makes a lane change from an adjacent lane adjacent to the host vehicle lane to the host vehicle lane (a lane change situation). In the merging situation, because other vehicles inevitably enter the host vehicle lane, the interrupting vehicle recognizer 132 recognizes another vehicle located in a first reference range A1 in which the host vehicle M becomes a reference in the merging lane merging into the host vehicle lane as an interrupting vehicle.

Figure 4:
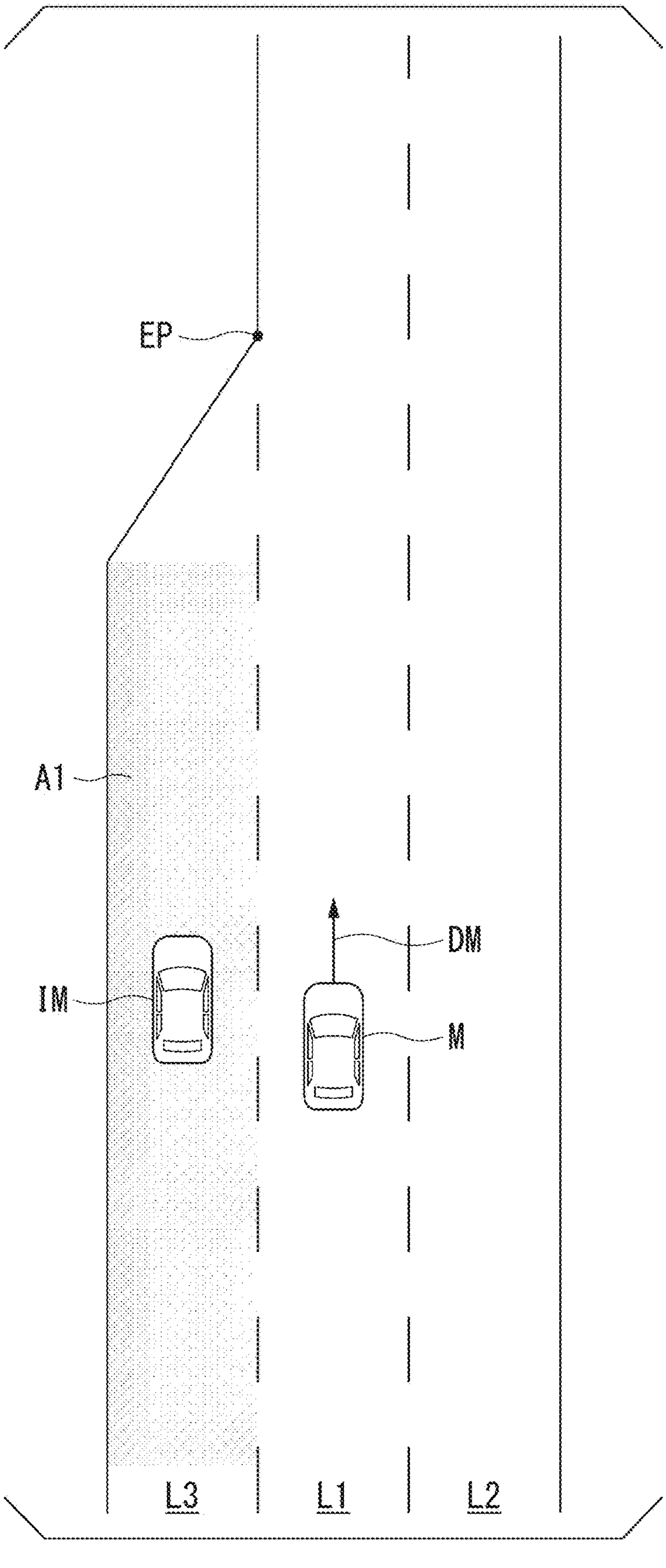
FIG. 4 is a diagram showing a state in which an interrupting vehicle is recognized in a merging situation.

FIG. 4 is a diagram showing a state in which the interrupting vehicle is recognized in the merging situation. In FIGS. 4, L1 and L2 denote main lanes, L3 denotes a merging lane, EP denotes an end point of the merging lane, DM denotes a traveling direction of the host vehicle M, IM denotes another vehicle recognized as the interrupting vehicle, and A1 denotes the first reference range. The end point EP is an end point of a section where the interrupting vehicle IM can cut into a lane in which the host vehicle M is traveling.

Figure 5:
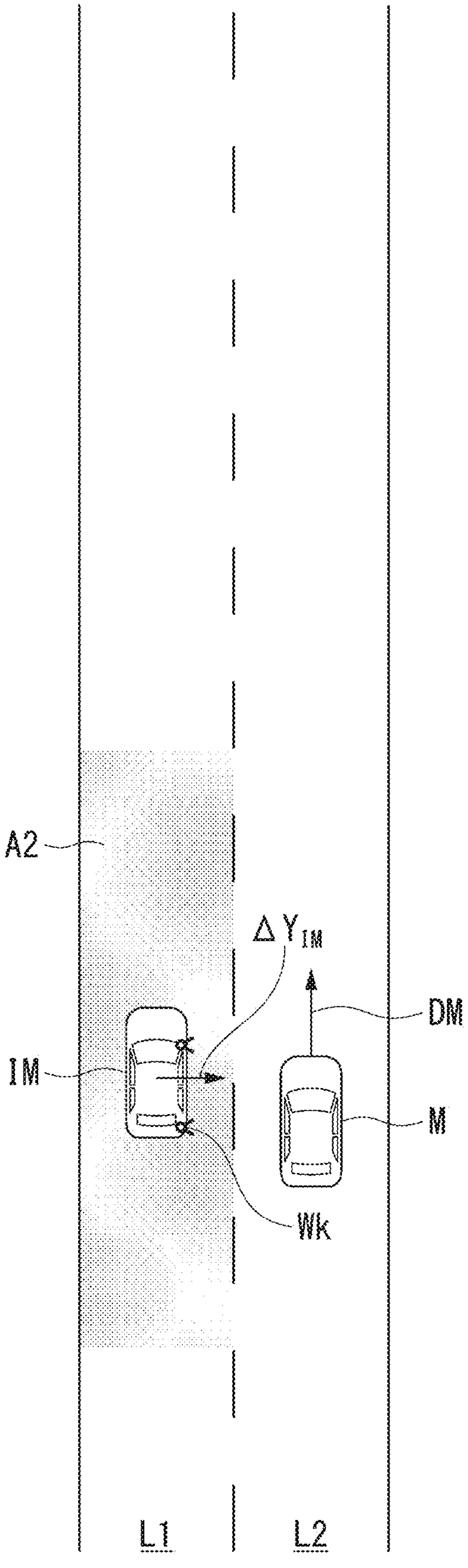
FIG. 5 is a diagram showing a state in which an interrupting vehicle is recognized in a lane change situation.

FIG. 5 is a diagram showing a state in which the interrupting vehicle is recognized in the lane change situation. In this situation, the interrupting vehicle recognizer 132 decides whether or not to recognize another vehicle as the interrupting vehicle based on an operating state of a direction indicator Wk, a lateral movement amount $\Delta Y_{IM}$, changes therein, and the like with respect to the other vehicle in a second reference range A2. Various methods are considered for a process related to this decision and special examples are omitted.

The following description will focus exclusively on the time of merging. When the interrupting vehicle IM is recognized, the interruption controller 142 decides whether to put the interrupting vehicle IM in front of or behind the host vehicle M. For example, the interruption controller 142 decides whether to put the interrupting vehicle IM in front of the host vehicle M or behind the host vehicle M based on a speed difference between the speed of the host vehicle M and the speed of the interrupting vehicle IM, a front-rear relationship of a predicted position at a prescribed time in the future, and the like. When it is decided to put the interrupting vehicle IM in front of the host vehicle M, the interruption controller 142 performs deceleration control for putting the interrupting vehicle IM in front of the host vehicle M in principle. If a condition that the speed of the interrupting vehicle IM is sufficiently high compared to the speed of the host vehicle M is satisfied, the interruption controller 142 may decide not to perform deceleration control when the interrupting vehicle IM is put in front of the host vehicle M or may decide to necessarily perform deceleration control when the interrupting vehicle IM is put in front of the host vehicle M. The interruption controller 142 calculates the necessary deceleration so that the relationship between the interrupting vehicle IM and the host vehicle M at the end point EP is suitable and reflects the calculated deceleration in a speed element of a target trajectory.

The mode change processor 154 of the mode decider 150 restricts the implementation of mode A and/or mode B when the interrupting vehicle IM is recognized and a prescribed condition is satisfied. "Restricting the implementation of mode A and/or mode B" is, for example, changing the operation mode to any one of modes C to E. When the operation mode is changed from mode A or B to mode D or E, mode C may be interposed therebetween. In this case, when the driver has not gripped the steering wheel 82 during a period of mode C, the action plan generator 140 may temporarily stop the vehicle on the shoulder or the like, and then change the driving mode to mode D or E.

A prescribed condition is, for example, that any one of the following conditions (1) to (5) is satisfied. Conditions (1) to (4) are conditions for determining whether or not a result of deceleration control for putting the interrupting vehicle IM in front of the host vehicle M is excessive. Condition (5) is a condition for determining whether or not it is difficult to control the vehicle in automated driving or advanced driving assistance. Because it is determined that vehicle control during interruption in automated driving or advanced driving assistance is likely to be difficult when any one of these conditions is satisfied, the mode change processor 154 restricts the implementation of mode A and/or mode B. Thereby, it is possible to entrust the peripheral monitoring duties and driving operations to the driver of the host vehicle M at an appropriate timing and it is possible to suppress a chaotic traffic situation. Therefore, according to the embodiment, appropriate control can be performed according to a situation during interruption.

Figure 6:
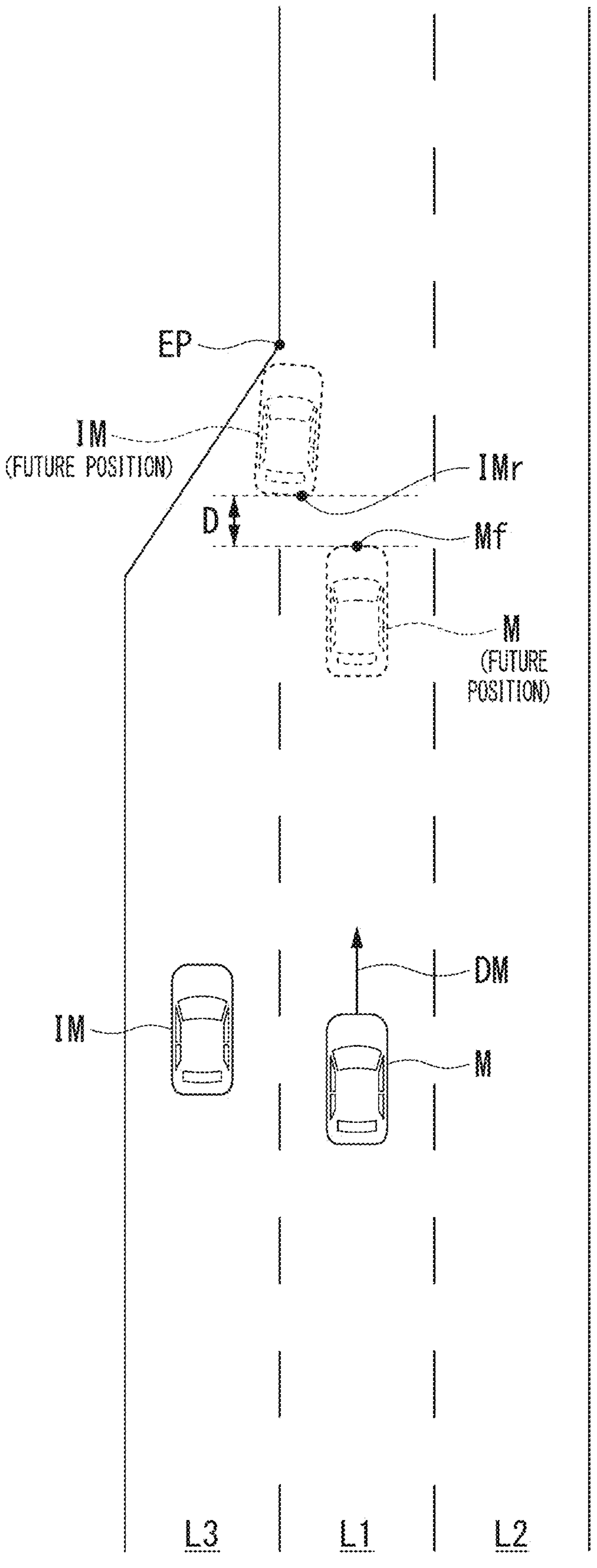
FIG. 6 is a diagram for describing an inter-vehicle distance at an end point.

Condition (1) is that a magnitude of deceleration (maximum deceleration) due to deceleration control is greater than or equal to reference deceleration Gr and a degree of proximity between the interrupting vehicle IM and the host vehicle M at the end point EP is higher than a first reference degree. The mode change processor 154 determines whether or not the maximum deceleration is greater than or equal to reference deceleration Gr, for example, with reference to a speed element of a target trajectory. Alternatively, the mode change processor 154 may acquire a control schedule from the speed controller 164 to determine whether or not the maximum deceleration is greater than or equal to the reference deceleration Gr. The reference deceleration Gr is, for example, a value of about 0.2 to 0.3 [g]. The term "the degree of proximity is higher than the first reference degree" indicates, for example, that one of a case where it is predicted that positions of the host vehicle M and the interrupting vehicle IM will overlap at the end point EP and the speed of the host vehicle M at that time will be less than or equal to a third reference speed V3 and a case where it is predicted that the speed of the host vehicle M at the end point EP will be higher than the third reference speed V3, a forward inter-vehicle distance D between the host vehicle M and the interrupting vehicle IM at the end point EP will be less than a third reference inter-vehicle distance D3, and a rearward inter-vehicle distance Dr between the host vehicle M and the interrupting vehicle IM at the end point EP will be less than a fourth reference inter-vehicle distance D4 occurs. FIG. 6 is a diagram for describing the inter-vehicle distance D at the end point EP. As shown in FIG. 6, the forward inter-vehicle distance D is a distance between a front end Mf of the host vehicle M and a rear end IMr of the interrupting vehicle IM. Although not shown in FIG. 6, the rearward inter-vehicle distance Dr is a distance between a rear end of the host vehicle M and a front end of the interrupting vehicle IM.

Figure 7:
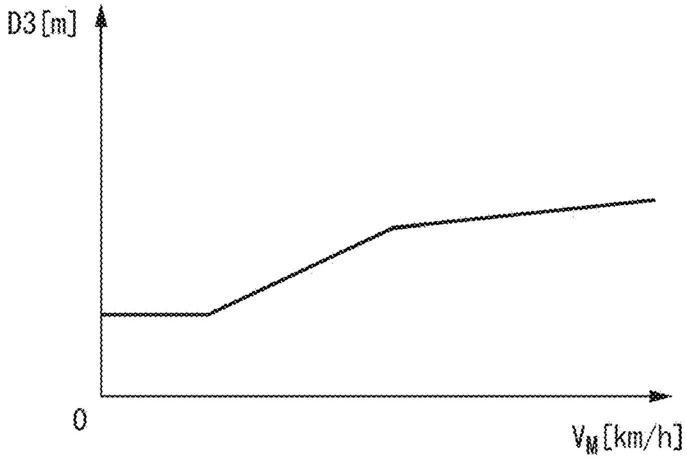
FIG. 7 is a diagram for describing processing characteristics when a third reference inter-vehicle distance is decided based on the speed of a host vehicle.

The mode change processor 154 may make the above-described determination using the third reference inter-vehicle distance D3 or the fourth reference inter-vehicle distance D4, which is a fixed value of several meters [m] to several tens of meters [m], or may dynamically change the third reference inter-vehicle distance D3 or the fourth reference inter-vehicle distance D4 based on a speed VM of the host vehicle M. FIG. 7 is a diagram for describing processing characteristics when the third reference inter-vehicle distance D3 is decided based on the speed VM of the host vehicle M. The mode change processor 154 may increase the third reference inter-vehicle distance D3 as the speed VM of the host vehicle M increases.

Figure 8:
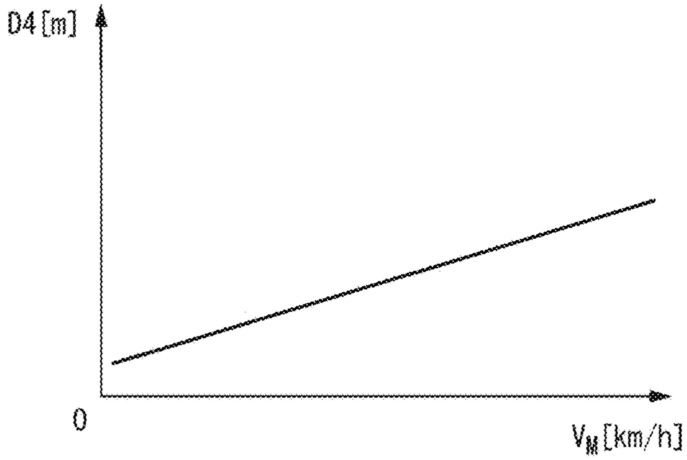
FIG. 8 is a diagram for describing processing characteristics when a fourth reference inter-vehicle distance is decided based on the speed of the host vehicle.

FIG. 8 is a diagram for describing processing characteristics when the fourth reference inter-vehicle distance D4 is decided based on the speed VM of the host vehicle M. The mode change processor 154 may increase the fourth reference inter-vehicle distance D4 as the speed VM of the host vehicle M increases. Also, the speed VM of the host vehicle may be estimated by the action plan generator 140 based on a detected value of the wheel speed sensor. A situation where condition (1) is satisfied is a situation where deceleration of a degree to which an occupant of the host vehicle M feels uncomfortable due to deceleration control occurs (is predicted to occur or has occurred). The automated driving control device 100 can suppress a chaotic traffic situation by restricting the implementation of mode A and/or mode B in this situation. When the condition that "the forward inter-vehicle distance D between the host vehicle M and the interrupting vehicle IM at the end point EP is less than the third reference inter-vehicle distance D3 and the rearward inter-vehicle distance Dr between the host vehicle M and the interrupting vehicle IM at the end point EP is less than the fourth reference inter-vehicle distance D4" is not satisfied, the host vehicle M and the interrupting vehicle IM are sufficiently distant from each other at the end point EP. In this case, the mode change processor 154 does not restrict the implementation of mode A and/or mode B, and the interruption controller 142 causes the host vehicle M to pass through the end point EP as it is without performing deceleration control for putting the interrupting vehicle IM in front.

Condition (2) is that an elapsed period of time after the start of the deceleration control is greater than or equal to a first reference period of time T1 and an increase degree of the inter-vehicle distance D between the host vehicle M and the interrupting vehicle IM is lower than a second reference degree. The first reference period of time T1 is, for example, a period of time of about several seconds [see]. "The increase degree of the inter-vehicle distance D is lower than the second reference degree" indicates, for example, that the inter-vehicle distance D is less than or equal to a fifth reference inter-vehicle distance D5 and an increased amount in an inter-vehicle distance obtained by subtracting an average value E(D) of the inter-vehicle distance during a previous third reference period of time T3 from the inter-vehicle distance D is not positive during a fourth reference period of time T4. The third reference period of time T3 is, for example, a period of time of 1 [see] or less. The fourth reference period of time T4 is, for example, about the same as the first reference period of time T1.

Figure 9:
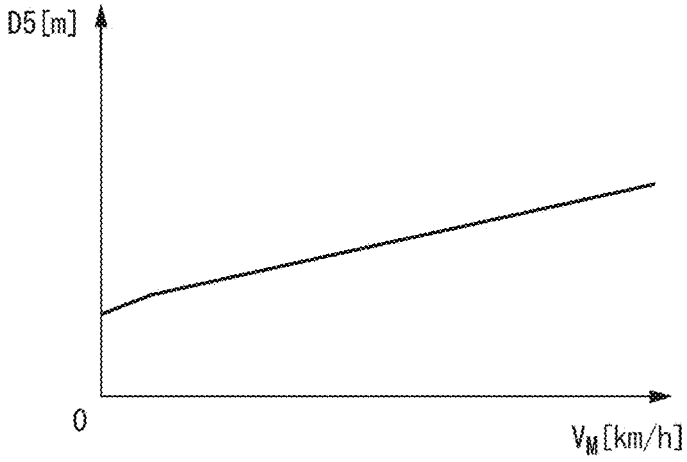
FIG. 9 is a diagram for describing processing characteristics when a fifth reference inter-vehicle distance is decided based on the speed of the host vehicle.

The mode change processor 154 may make the above-described determination using the fifth reference inter-vehicle distance D5, which is a fixed value of several meters to several tens of meters [m], or may dynamically change the fourth reference inter-vehicle distance D4 based on the speed VM of the host vehicle M. FIG. 9 is a diagram for describing processing characteristics when the fifth reference inter-vehicle distance D5 is decided based on the speed VM of the host vehicle M. The mode change processor 154 may increase the fifth reference inter-vehicle distance D5 as the speed VM of the host vehicle M increases. A situation where condition (2) is satisfied is a situation where the distance between the host vehicle M and a preceding vehicle FM is not easily kept even with deceleration control. The automated driving control device 100 can suppress a chaotic traffic situation by restricting the implementation of mode A and/or mode B in this situation.

Condition (3) is that both the speed VM of the host vehicle M and the speed VIM of the interrupting vehicle IM are less than or equal to a first reference speed V1 and a state in which an inter-vehicle distance DFM between the host vehicle M and the preceding vehicle FM located in front of the host vehicle M in the host vehicle lane is greater than or equal to the first reference inter-vehicle distance D1 has continued for a second reference period of time T2 or longer. The first reference speed V1 is, for example, a speed of less than 10 [km/h]. The first reference inter-vehicle distance D1 is, for example, a distance of several meters [m] to several tens of meters [m]. The second reference period of time T2 is, for example, a period of time of about several seconds [see]. A situation where condition (3) is satisfied is a situation where the host vehicle M and the interrupting vehicle IM are traveling at a low speed and the inter-vehicle distance between the host vehicle M and the preceding vehicle FM is not easily kept. The automated driving control device 100 can suppress a chaotic traffic situation by restricting the implementation of mode A and/or mode B in this situation.

Condition (4) is that the speed VM of the host vehicle M has decreased to a second reference speed V2 or higher after the start of the deceleration control. The second reference speed V2 is, for example, a speed of about 20 to 60 [km/h]. If condition (4) is satisfied, this indicates that there is a situation where the interrupting vehicle IM is not in a suitable state for the interrupting vehicle IM to easily enter the host vehicle lane even with deceleration control. The automated driving control device 100 can suppress a chaotic traffic situation by restricting the implementation of mode A and/or mode B in this situation.

Figure 10:
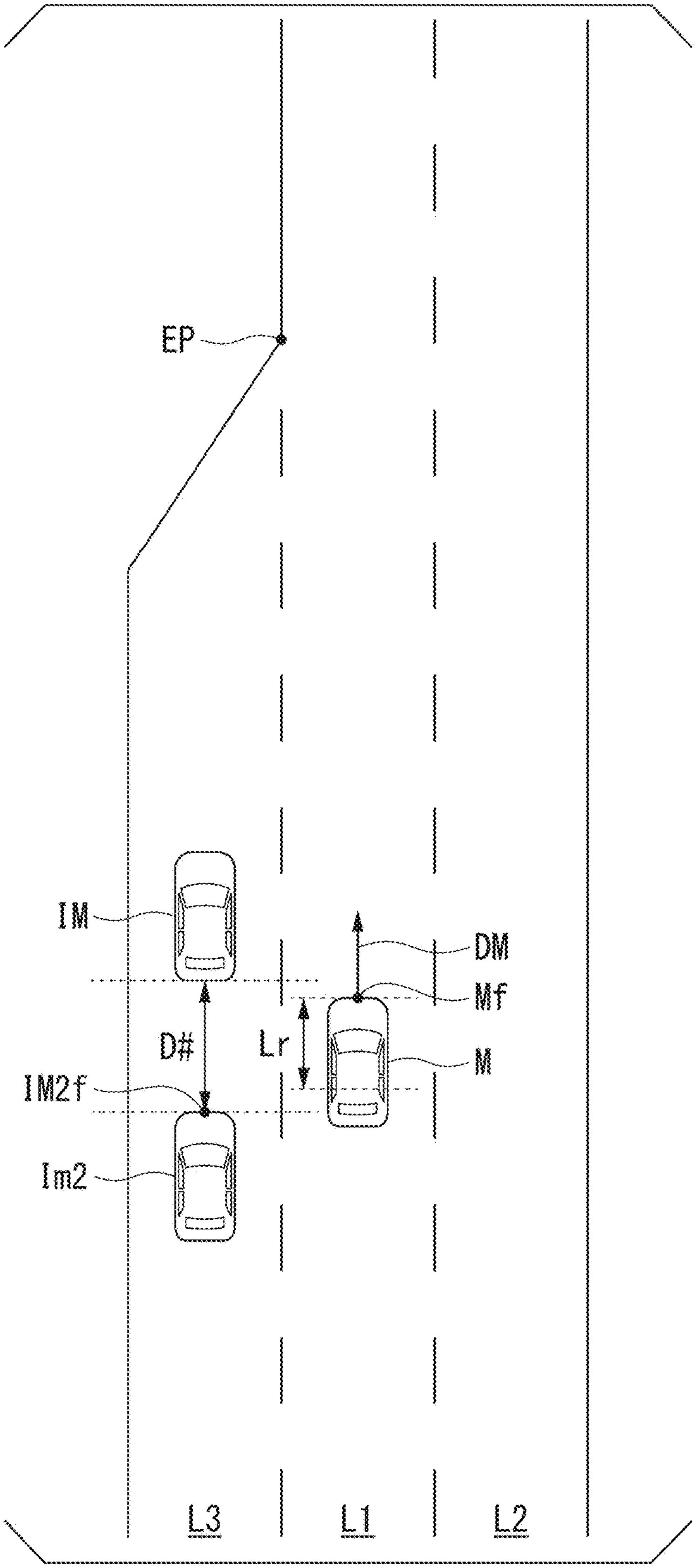
FIG. 10 is a diagram for describing condition (5).

Condition (5) is that the speed VM of the host vehicle M is less than or equal to the third reference speed V3, there is another vehicle (hereinafter referred to as a second interrupting vehicle IM2) which is located behind the interrupting vehicle IM and whose inter-vehicle distance D #from the interrupting vehicle IM is less than the second reference inter-vehicle distance D2, and a front end IM2f of the second interrupting vehicle IM2 is located behind a point a reference distance Lr behind the front end Mf of the host vehicle M. FIG. 10 is a diagram for describing condition (5). The third reference speed V3 is, for example, a speed of several tens of kilometers per hour [km/h]. The second reference inter-vehicle distance D2 is, for example, a distance of about several meters [m] to several tens of meters [m]. The reference distance Lr is, for example, a distance of several meters [m]. A situation where condition (5) is satisfied is a situation where vehicle control based on automated driving or advanced driving assistance is likely to be difficult because both the interrupting vehicle IM and the second interrupting vehicle IM2 must be monitored. The automated driving control device 100 can suppress a chaotic traffic situation by restricting the implementation of mode A and/or mode B in this situation.

[Processing Flow]

Figure 11:
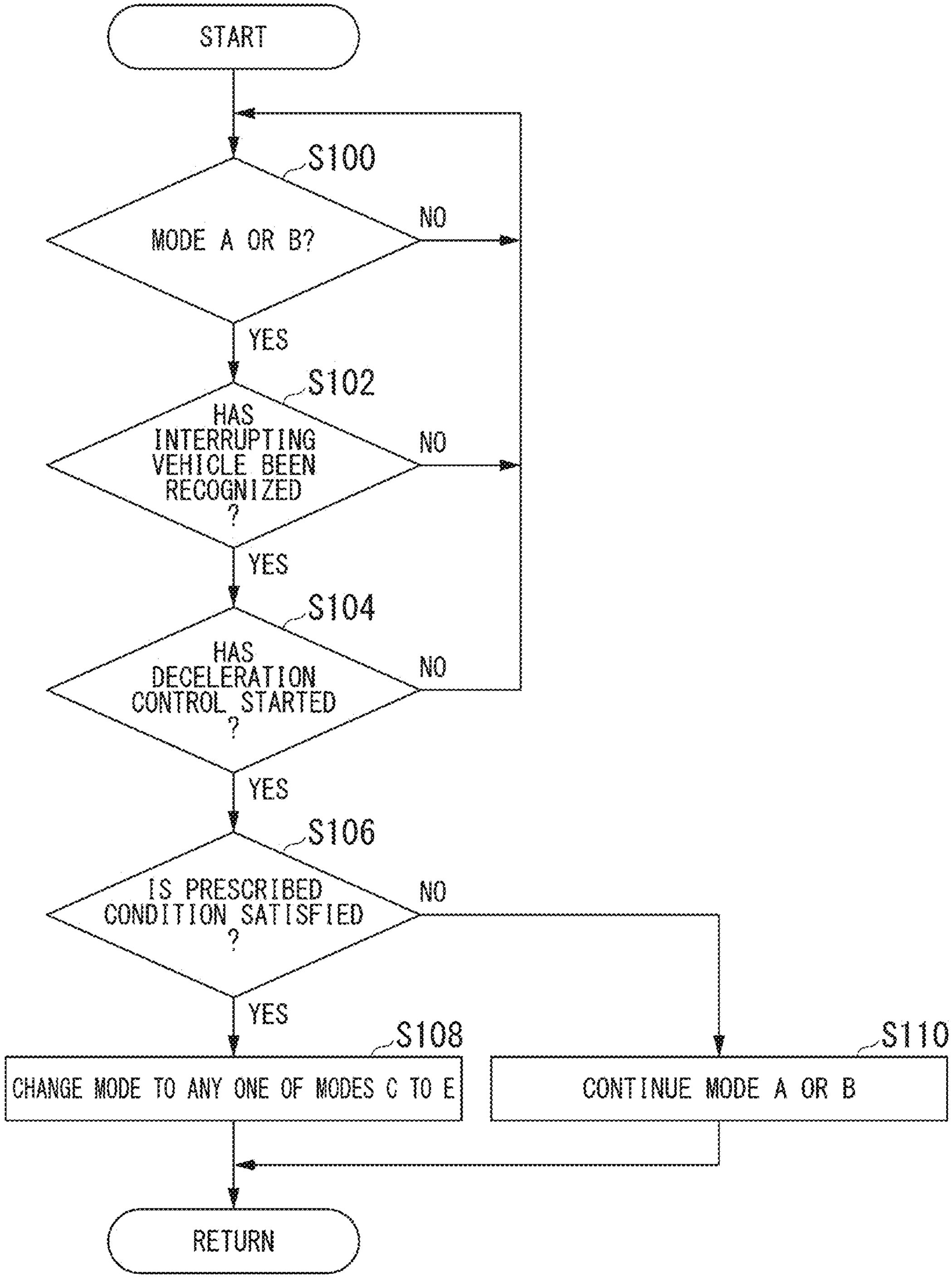
FIG. 11 is a flowchart showing an example of a flow of a process executed by a mode change processor.

FIG. 11 is a flowchart showing an example of a flow of a process executed by the mode change processor 154. First, the mode change processor 154 determines whether or not the driving mode of the host vehicle M is mode A or B (step S100). When it is determined that the driving mode of the host vehicle M is not mode A or B, the processing of step S100 is executed iteratively.

When it is determined that the driving mode of the host vehicle M is mode A or B, the mode change processor 154 determines whether or not the interrupting vehicle recognizer 132 has recognized the interrupting vehicle IM (step S102). If it is determined that the interrupting vehicle recognizer 132 has not recognized the interrupting vehicle, the process is returned to step S100.

When it is determined that the interrupting vehicle recognizer 132 has recognized the interrupting vehicle, the mode change processor 154 determines whether or not the interruption controller 142 has started deceleration control for putting the interrupting vehicle IM in front of the host vehicle M (step S104). When it is determined that the interruption controller 142 has not started deceleration control, the process is returned to step S100. Also, the processing of step S104 is omitted and the process may proceed to step S106 when a positive determination result has been obtained in step S102.

When it is determined that the interruption controller 142 has started deceleration control, the mode change processor 154 determines whether or not a prescribed condition is satisfied (step S106). When a prescribed condition is satisfied, the mode change processor 154 changes the operation mode of the host vehicle M to any one of modes C to E (step S108). When the prescribed conditions are not satisfied, the mode change processor 154 continues the mode A or B (step S110).

According to the embodiment described above, the mode change processor 154 can perform appropriate control according to a situation during interruption because the implementation of modes A and/or B is restricted when the interrupting vehicle recognizer 132 recognizes the interrupting vehicle IM and a prescribed condition is satisfied.

The Embodiment Described Above can be Represented as Follows

A vehicle control device including:

a storage device storing a program; and a hardware processor, wherein the hardware processor executes the program to:

recognize a surrounding situation of the vehicle;

control steering, acceleration, and deceleration of the vehicle independently of an operation of a driver of the vehicle;

decide on a driving mode of the vehicle as one of a plurality of driving modes including a first driving mode and a second driving mode and change the driving mode of the vehicle to a driving mode having a heavier task when a task related to the decided driving mode is not executed by the driver, wherein the second driving mode is a driving mode having a lighter task imposed on the driver than the first driving mode and some of the plurality of driving modes including at least the second driving mode are controlled by the driving controller;

recognize an interrupting vehicle that is a vehicle cutting into a travel path along which the vehicle is traveling during the recognition; and restrict implementation of the second driving mode when the interrupting vehicle is recognized and a prescribed condition is satisfied.

Although modes for carrying out the present invention have been described above using embodiments, the present invention is not limited to the embodiments and various modifications and substitutions can also be made without departing from the scope and spirit of the present invention.

REFERENCE SIGNS LIST

10 Camera
12 Radar device
14 LIDAR sensor
16 Physical object recognition device
70 Driver monitor camera
82 Steering wheel
84 Steering grip sensor
100 Automated driving control system
130 Recognizer
132 Interrupting vehicle recognizer
140 Action plan generator
142 Interrupt controller
150 Mode decider
152 Driver state determiner
154 Mode change processor

What is claim is:

1. A vehicle control method comprising:

recognizing, by a computer mounted in a vehicle, a surrounding situation of the vehicle traveling in a travel lane;

controlling, by the computer, steering, acceleration, and deceleration of the vehicle independently of an operation of a driver of the vehicle;

deciding, by the computer, on a driving mode of the vehicle as one of a plurality of driving modes including a first driving mode and a second driving mode, the second driving mode being a driving mode having a lighter task imposed on the driver than the first driving mode, the lighter task being a task requiring less manual operation and having more automation, the second driving mode being performed by controlling the steering, the acceleration, and the deceleration of the vehicle independently of the operation of the driver of the vehicle;

controlling at least one of the plurality of driving modes including at least the second driving mode;

changing the driving mode of the vehicle to a driving mode having a heavier task when a task related to the decided driving mode is not executed by the driver, the heavier task being a task requiring more manual operation and has less automation;

recognizing, by the computer, an interrupting vehicle that is a vehicle cutting in front of the vehicle on the travel lane from a merging lane, the merging lane being a lane merging into the travel lane, a first direction in which the travel lane extends is the same as a second direction in which the merging lane extends, the merging lane including an interrupting section where the interrupting vehicle cuts into a lane in which the vehicle is traveling, the interrupting section including an end point located between the merging lane and the traveling;

restricting, by the computer, implementation of the second driving mode when the interrupting vehicle is recognized and a first condition is satisfied, the first condition being that an elapsed period of time after a start of deceleration control for allowing the interrupting vehicle to move in front of the vehicle on the travel lane is greater than or equal to a first reference period of time, the first condition being that a degree of proximity between the vehicle and the interrupting vehicle is higher than a first reference degree at the end point of the interrupting section;

performing, by the computer, the deceleration control so as to calculate deceleration required for the inter-vehicle distance between the interrupting vehicle and the vehicle at the end point of the interrupting section lane to be greater than or equal to a predetermined distance, and decelerating, by the computer, the vehicle at the calculated deceleration.

2. A vehicle control device comprising:

a storage device storing a program; and a hardware processor configured to execute the program to:

recognize a surrounding situation of a vehicle traveling in a travel lane control steering, acceleration, and deceleration of the vehicle independently of an operation of a driver of the vehicle, decide on a driving mode of the vehicle as one of a plurality of driving modes including a first driving mode and a second driving mode, the second driving mode being a driving mode having a lighter task imposed on the driver than the first driving mode, the lighter task being a task requiring less manual operation and having more automation, control at least one of the plurality of driving modes including at least the second driving mode, change the driving mode of the vehicle to a driving mode having a heavier task when a task related to the decided driving mode is not executed by the driver, the heavier task being a task requiring more manual operation and has less automation, recognize an interrupting vehicle that is a vehicle cutting in front of the vehicle on the travel lane from a merging lane, the merging lane being a lane merging into the travel lane, a first direction in which the travel lane extends is the same as a second direction in which the merging lane extends, the merging lane including an interrupting section where the interrupting vehicle cuts into a lane in which the vehicle is traveling, the interrupting section including an end point located between the merging lane and the traveling lane, and restrict implementation of the second driving mode when the interrupting vehicle is recognized and a first condition is satisfied, the first condition being that an elapsed period of time after a start of deceleration control for allowing the interrupting vehicle to move in front of the vehicle on the travel lane is greater than or equal to a first reference period of time, the first condition being that a degree of proximity between the vehicle and the interrupting vehicle is higher than a first reference degree at the end point of the interrupting section, perform the deceleration control so as to calculate deceleration required for the inter-vehicle distance between the interrupting vehicle and the vehicle at the end point of the interrupting section to be greater than or equal to a predetermined distance, and decelerate the vehicle at the calculated deceleration.

3. The vehicle control device according to claim 2, wherein the second driving mode is a driving mode in which a task of an operator gripping a steering wheel for receiving a steering operation is not imposed on the driver, and wherein the first driving mode is a driving mode in which a driving operation of the driver is necessary in relation to at least one of the steering of the vehicle and the acceleration and deceleration of the vehicle.

4. The vehicle control device according to claim 2, wherein the second driving mode is a driving mode in which a task of an operator gripping a steering wheel for receiving a steering operation is not imposed on the driver, and wherein the first driving mode is a driving mode in which at least the task of gripping the operator for receiving the steering operation of the driver is imposed on the driver.

5. The vehicle control device according to claim 2, wherein the first condition is that a magnitude of deceleration based on the deceleration control for allowing the interrupting vehicle to move in front of the vehicle on the travel path is greater than or equal to reference deceleration.

6. The vehicle control device according to claim 2, wherein the first condition is that speeds of the vehicle and the interrupting vehicle are less than or equal to a first reference speed and a state in which an inter-vehicle distance between the vehicle and a preceding vehicle located in front of the vehicle on the travel path is greater than or equal to a first inter-vehicle distance has continued for a second reference period of time or longer.

7. The vehicle control device according to claim 2, wherein the first condition is that the speed of the vehicle is decreased to a second reference speed or higher after a start of the deceleration control for allowing the interrupting vehicle to move in front of the vehicle on the travel path.

8. The vehicle control device according to claim 2, wherein the first condition is that there is another vehicle which is behind the interrupting vehicle and whose inter-vehicle distance from the interrupting vehicle is less than a second reference inter-vehicle distance.

9. A computer-readable non-transitory storage medium storing a program for causing a computer mounted in a vehicle to:

recognize a surrounding situation of the vehicle traveling in a travel lane;

control steering, acceleration, and deceleration of the vehicle independently of an operation of a driver of the vehicle;

decide on a driving mode of the vehicle as one of a plurality of driving modes including a first driving mode and a second driving mode, the second driving mode being a driving mode having a lighter task imposed on the driver than the first driving mode, the lighter task being a task requiring less manual operation and having more automation, the second driving mode being performed by controlling the steering, the acceleration, and the deceleration of the vehicle independently of the operation of the driver of the vehicle;

control at least one of the plurality of driving modes including at least the second driving mode;

change the driving mode of the vehicle to a driving mode having a heavier task when a task related to the decided driving mode is not executed by the driver, the heavier task being a task requiring more manual operation and has less automation;

recognize an interrupting vehicle that is a vehicle cutting in front of the vehicle on the travel lane from a merging lane, the merging lane being a lane merging into the travel lane, a first direction in which the travel lane extends is the same direction as a second direction in which the merging lane extends, the merging lane including an interrupting section where the interrupting vehicle cuts into a lane in which the vehicle is traveling, the interrupting section including an end point located between the merging lane and the travel lane;

restrict implementation of the second driving mode when the interrupting vehicle is recognized and a first condition is satisfied, the first condition being that an elapsed period of time after a start of deceleration control for allowing the interrupting vehicle to move in front of the vehicle on the travel lane is greater than or equal to a first reference period of time, the first condition being that a degree of proximity between the vehicle and the interrupting vehicle is higher than a first reference degree at the end point of the interrupting section;

perform the deceleration control so as to calculate deceleration required for the inter-vehicle distance between the interrupting vehicle and the vehicle at the end point of the interrupting section to be greater than or equal to a predetermined distance; and decelerate the vehicle at the calculated deceleration.

* * * * *